(No Model.)
J. FRASER.
WHEEL FOR VEHICLES.
No. 365,122. Patented June 21, 1887.
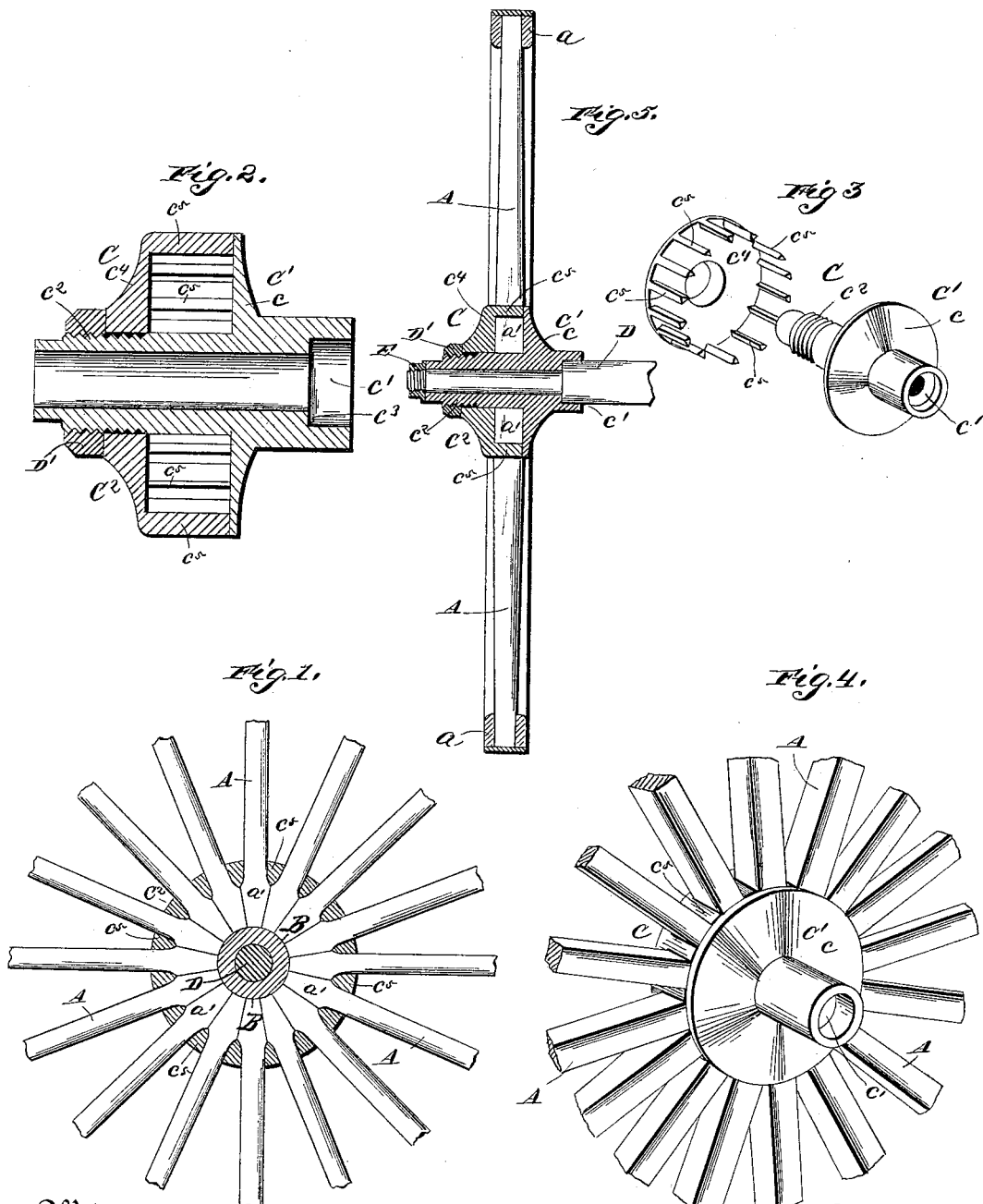

United States Patent Office.

JAMES FRASER, OF BRIDGETON, MICHIGAN.

WHEEL FOR VEHICLES.

SPECIFICATION forming part of Letters Patent No. 365,122, dated June 21, 1887.

Application filed February 8, 1887. Serial No. 226,969. (No model.)

*To all whom it may concern:*

Be it known that I, JAMES FRASER, a citizen of the United States, residing at Bridgeton, in the county of Newaygo and State of Michigan, have invented a new and useful Improvement in Wheels, of which the following is a specification.

The invention relates to improvements in wheels, referring particularly to the construction of the hub and the securing of the spokes therein; and its object is to make the union between the hub and spokes exceedingly strong and unyielding.

A further object is to permit the wheel to be quickly and readily taken apart or dismantled to replace a broken spoke, or for other necessary purpose.

The invention consists in the construction and novel arrangement of the hub and spokes, whereby the former, which is preferably of metal, binds and braces the spokes laterally, and at the same time wedges them apart, so as to prevent their inner ends from being loose or having any tremor within the hub, as hereinafter described, pointed out in the claims, and illustrated in the accompanying drawings, in which—

Figure 1 represents a side view of the wheel with the hub detached, showing the arrangement of the inner ends of the spokes. Fig. 2 represents a longitudinal section through the axis of the hub detached from the wheel. Fig. 3 represents perspective views of the two parts of which the hub is composed detached from each other. Fig. 4 represents a view of the outer side of the wheel put together and attached to the axle. Fig. 5 represents a vertical section of the same through the axis of the axle.

Referring to the drawings by letter, $a$ designates the rim of the wheel, and A A the spokes converging therefrom toward the center. The inner ends, $a'$ $a'$, of the spokes are enlarged and flattened laterally, the sides of said ends lying in radial planes of the wheel. The said inner ends lie against or impinge on each other laterally, their sides being inclined to fit against each other for their entire length.

B is a circular opening at the center of the wheel for the passage of the stem of one part of the hub.

C is the hub, composed of the two parts $C'$ and $C^2$. The part $C'$ has upon it the collar or disk $c$, the inner surface of which lies against the inner surface of the wheel over the ends of the spokes. The part $C'$ has a hollow boss, $c'$, on its inner side and a hollow externally-threaded stem, $c^2$, on its outer side. This stem engages a nut, hereinafter described. The bore or opening runs through the boss and the stem $c^2$, and is a journal for the axle D, an interior shoulder, $c^3$, in said bore or opening bearing against a similar shoulder on the axle. The part $C^2$ of the hub lies against the other side of the wheel, covering the ends of the spokes, and having the stem of the part $C'$ passing through its center opening. The collar or disk $c^4$ of the part $C^2$ lies against the spokes, and from its edge stand inward the projections $c^5$ $c^5$, each of which passes between two adjoining spokes and is triangular in cross-section, so as to wedge itself between the said spokes and prevent their ends from moving laterally.

$D'$ is a nut engaging the threaded end of the stem of the part $C'$, and situated, when in place, against the outer surface of the part $C^2$, thus holding the said parts of the hub together and the wedge-shaped projections $c^5$ between the spokes.

E is a nut on the threaded end of the journal of the axle, which nut bears against the end of the stem $c^2$ of the part $C'$, so that the wheel turns freely on the axle.

The disk-like parts of the hub clasp the ends of the spokes between them, and as they are drawn together by the nut D they bind the edges of the spokes tightly in place. The hub thus performs two functions besides its ordinary duty, which functions are the binding of the spokes from side to side by the collars or disks of the hub and the wedging of the spokes in place by the projections $c^5$ of the part $C^2$.

It is evident from the above description that the wheel is very strong, that the union between the hub and the spokes is very perfect and unyielding, and that the wheel can be very quickly and easily taken apart or dismantled for any necessary purpose.

Having described my invention, I claim—

In a wheel, the combination of the hub-section $C'$, having the circular collar or disk $c$, flat on one side, the annular boss $c'$, projecting from the rear side of the collar and having the interior annular recess forming the shoulder $c^3$, for the purpose set forth, and the stem or sleeve $c^2$, projecting from the front side of the collar and threaded at its outer end, the hub-section C, slipped over the sleeve or stem and having the rearward-projecting series of arms $c^5$, triangular in cross-section, and having their apices projecting toward the center of the hub, the spokes A, having the enlarged flattened wedge-shaped inner ends, $a$, inserted between the sections C and C', the arms $c^5$ being arranged between each pair of spokes and bearing against the shoulders formed at the outer ends of the enlarged portions $a'$ thereof, the nut D', screwed onto the outer end of the sleeve or stem and clamping the sections C and C' against opposite sides of the spokes, and the axle having its spindle extending through the sleeve and provided at its outer end with the nut E, substantially as described.

In testimony that I claim the foregoing as my own I have hereto affixed my signature in presence of two witnesses.

JAMES FRASER.

Witnesses:
GEORGE LUTON,
IRA CRONK.